United States Patent
Philyaw et al.

(10) Patent No.: US 6,829,646 B1
(45) Date of Patent: Dec. 7, 2004

(54) PRESENTATION OF WEB PAGE CONTENT BASED UPON COMPUTER VIDEO RESOLUTIONS

(75) Inventors: Jeffry Jovan Philyaw, Dallas, TX (US); David Kent Mathews, Carrollton, TX (US)

(73) Assignee: L. V. Partners, L.P., Dallas, TX (US)

(*) Notice: Subject to any disclaimer, the term of this patent is extended or adjusted under 35 U.S.C. 154(b) by 0 days.

(21) Appl. No.: 09/417,405

(22) Filed: Oct. 13, 1999

(51) Int. Cl.[7] .............................................. G06F 15/16
(52) U.S. Cl. ...................... 709/228; 709/206; 709/246
(58) Field of Search ................................ 345/774, 765; 709/203, 202, 217, 296, 208, 212, 207, 206, 220, 221, 222, 227, 228, 229, 236; 707/10, 517; 713/201; 348/567

(56) References Cited

U.S. PATENT DOCUMENTS

| | | | |
|---|---|---|---|
| 4,642,790 A | 2/1987 | Minshull et al. ............ 364/900 |
| 4,710,727 A | 12/1987 | Rutt ............................ 330/110 |
| 4,783,648 A | 11/1988 | Homma et al. ............. 340/724 |
| 4,823,108 A | 4/1989 | Pope ........................... 340/721 |
| 4,823,303 A | 4/1989 | Terasawa .................... 364/521 |
| 4,890,098 A | 12/1989 | Dawes et al. ............... 340/721 |
| 4,896,148 A | 1/1990 | Kurita ......................... 340/731 |
| 5,060,170 A | 10/1991 | Bourgeois et al. .......... 364/521 |
| 5,179,700 A | 1/1993 | Aihara et al. ............... 395/650 |
| 5,227,771 A | 7/1993 | Kerr et al. ................... 340/731 |
| 5,721,848 A | 2/1998 | Joseph ........................ 395/339 |
| 5,737,619 A | 4/1998 | Judson ........................ 395/761 |
| 5,884,014 A | 3/1999 | Huttenlocher et al. ...... 395/114 |
| 6,076,166 A * | 6/2000 | Moshfeghi et al. ......... 713/201 |
| 6,085,247 A * | 7/2000 | Parsons et al. ............. 709/227 |
| 6,185,589 B1 * | 2/2001 | Votipka ....................... 707/517 |
| 6,311,185 B1 * | 10/2001 | Markowitz et al. ........... 707/10 |
| 6,317,789 B1 * | 11/2001 | Rakavy et al. .............. 709/224 |
| 6,337,717 B1 * | 1/2002 | Nason et al. ................ 348/567 |

* cited by examiner

Primary Examiner—Paul H. Kang
(74) Attorney, Agent, or Firm—Howison & Arnott, L.L.P.

(57) ABSTRACT

An architecture for customizing the amount of web page banner advertising content presented to a user. When a user accesses a server node (102) disposed on a network (104), the user computer (100) provides video resolution information to the server node (102). The server node (102) transmits a web page to the user node (100) which corresponds to the video resolution information of the user node (100). The web page increases the amount of banner advertising presented to the user based upon the user video resolution information provided by the user node (100). The amount of banner advertising is increased by either increasing banner object size or providing more banner advertisements.

18 Claims, 3 Drawing Sheets

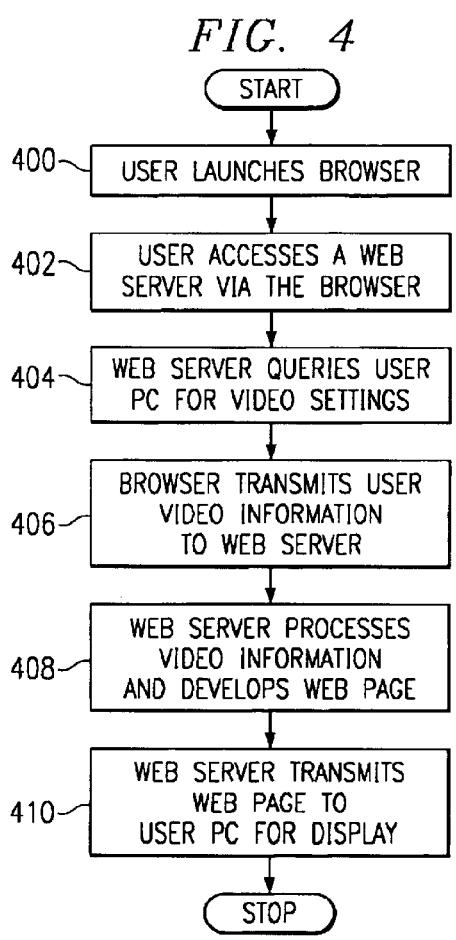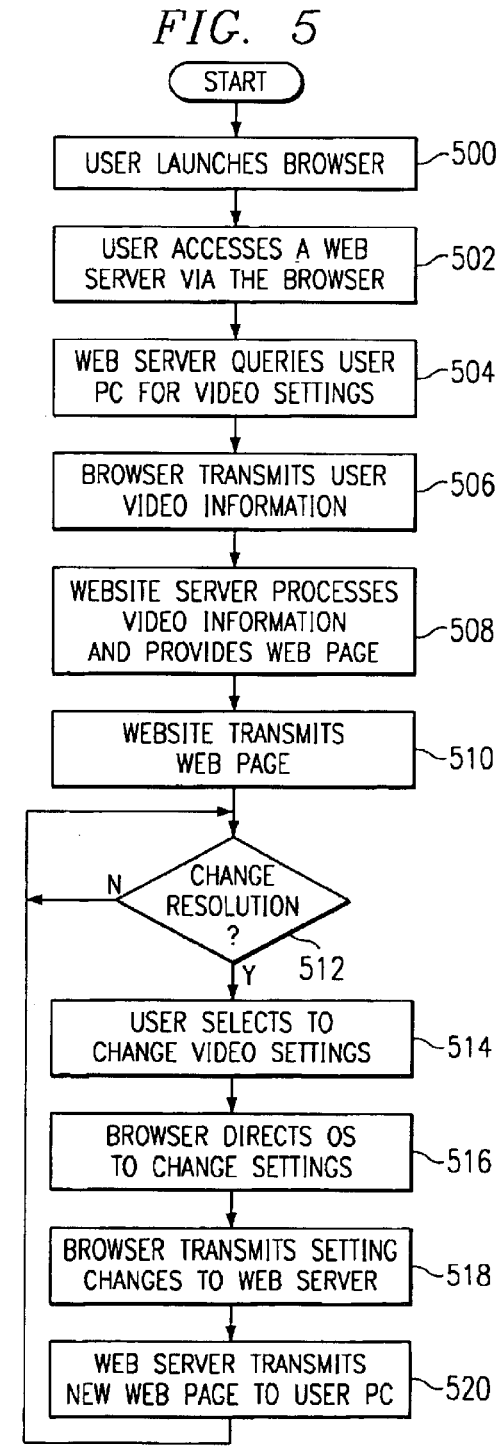

PRESENTATION OF WEB PAGE CONTENT BASED UPON COMPUTER VIDEO RESOLUTIONS

CROSS-REFERENCE TO RELATED APPLICATIONS

This application is related to pending U.S. patent application Ser. No. 09/378,221 entitled "METHOD AND APPARATUS FOR ACCESSING A REMOTE LOCATION BY SCANNING AN OPTICAL CODE."

TECHNICAL FIELD OF THE INVENTION

This invention is related to computer display windowing and, more particularly, to the sensing of computer display resolution and displaying additional web page content based upon the computer display resolution.

BACKGROUND OF THE INVENTION

The competitiveness which exists in the computing market has had a positive effect for the purchasing consumer by driving prices down on most computer-related equipment and peripherals. When the substantial increase in computer sales is coupled with the equally large number of consumers becoming "connected" to global communication packet-switched networks (e.g., one of which is commonly known as the Internet), and the enormous potential for reaching those connected consumers with product advertising, a very competitive marketplace results to place as much web page advertising in front of the computer user as is possible.

One necessary component of a computing system, the monitor, is also experiencing rapid cost reductions and technological change. The early "standard" fourteen-inch display was a common fixture for most computing systems. Rapid advances in display technology have driven prices down, such that the average consumer no longer purchases a computer with a once-standard fourteen-inch monitor, but is more likely to buy a packaged system having a seventeen inch display. Furthermore, the larger nineteen and twenty-one inch units are also becoming more popular since the costs for such units are no longer prohibitive for the average consumer.

Along similar lines of technology, video technology has also evolved such that these larger monitors can, now handle greater resolutions allowing for the presentation of more information in a viewable area (hereinafter called a "viewport") to the user. However, to accommodate the majority of legacy systems projected to currently exist in the hands of consumers, and that are configured at predominantly the 640x480 resolution, many software developers write applications for a resolution of 640x480. With a higher number of larger monitors now in use, the 640x480 resolution is less adequate and users now reconfigure to higher resolutions (e.g., 800x600, 1024x768, etc.) which impacts the way the information is presented to the user.

With the advent of a global communication packet-switched network (GCN) and e-commerce, display resolution eventually translates into dollars in the context of banner advertising on web pages. One commercial aspect of the GCN provides that those website server owners who allow vendor advertising on their web pages receive compensation according to the number of "hits" a particular banner generates. The more hits, the greater the compensation for the website owner. Therefore, the more popular or widely known the advertising product, the greater the potential for a large number of hits having a corresponding increase in revenue for the website owner.

With web page "real estate" becoming a revenue-generating aspect, methods for optimizing use of such real estate become increasingly important. Considering the viewport aspects of monitor resolution and display size, web page real estate can be optimized to obtain the most dollars when presenting advertising banners to the consumer. However, when moving to higher resolutions, existing methods spread the banners out by inserting spacing material between the banners while maintaining the size of the banner. Thus, content objects which were a fixed distance apart under a low resolution of 640x480 are now further apart when viewed at a resolution of 1024x768. The content objects are visually centered by being spaced further apart to display information to the user in a more presentable manner by, for example, providing symmetry around a central horizontal and/or vertical axis.

The economic aspects of placing more advertising content in front of the viewer are directly impacted by the spacing of content objects, since website server owners are paid according to the amount of advertising real estate placed in front of the viewer. Inserting additional spacing material between content objects does not take advantage of the increase in viewing area provided to the viewer under higher resolutions. Therefore, it is desirable to employ a technique where an increase in display resolution provides a corresponding increase in banner income by increasing the amount of advertising real estate placed on the viewer's display without the insertion of spacing material. Such an application enhances optimization of banner advertising on-web pages by now being able to charge for web page real estate presented at the user level.

SUMMARY OF THE INVENTION

The invention disclosed and claimed herein comprises a method of presenting banner advertising of a web page to a user. A user node and a server node are provided both of which are disposed on a network. The server node obtains video resolution information of the user node in response to the user accessing the server node. The server node transmits to the user node a web page corresponding to the video resolution of the user node.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a flowchart of the process for a vendor server detecting and developing a web page according to the user video settings; and FIG. 5 illustrates a flowchart of the process for implementing the tickler advertisement and resolution selection regions.

DETAILED DESCRIPTION OF THE INVENTION

Figure 1:
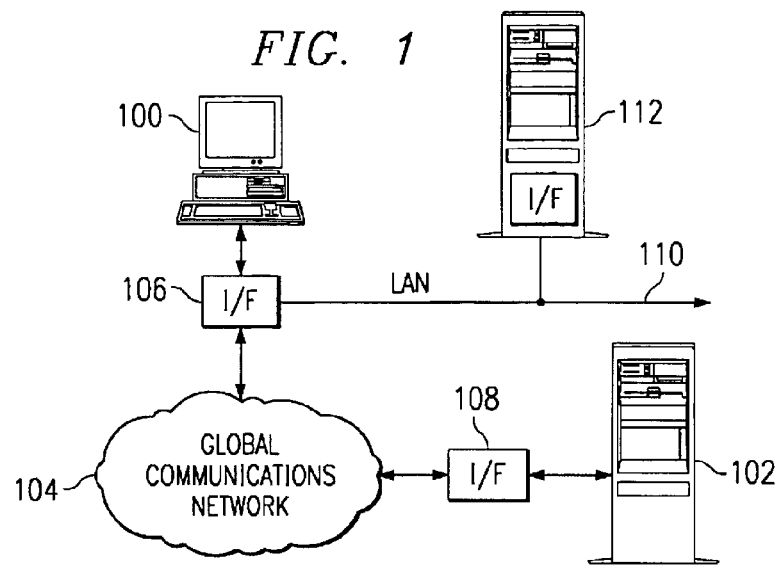
FIG. 1 illustrates a system according to a disclosed embodiment.

Referring now to FIG. 1, there is illustrated a system according to a disclosed embodiment. A user at a personal computer (PC) 100 accesses a website server 102 disposed on a global communication network (GCN) 104. Both the user PC 100 and the website server 102 connect to the GCN 104 through respective network interface devices 106 and 108. The user PC 100 is operable to run a browser application for accommodating compatible browser languages (e.g., HTML) provided on any of one or more of the website servers 102. Upon accessing the website server 102, the website server 102 obtains the video resolution setting of the user PC 100. This may be accomplished in a number of ways, for example, by the browser application obtaining the video resolution information from the user PC 100 operating system (OS) and transmitting the resolution information during the website accessing process, or through a subsequent query process by the website server 102 of the user PC 100.

The query process involves transmitting a resolution-request signal to the user PC 100 to ascertain the current video resolution setting of the user PC 100 display. The user PC 100 responds by sending the resolution information back to the website server 102, this process performed without the knowledge of the user. In response, the website server 102 transmits the initial and subsequent web pages to the user PC 100 optimized for banner advertising according to the resolution of the user PC 100. Conventional techniques transmit a web page having a fixed number of object regions associated with any resolution of the user PC 100, and account for this short-coming by visually-centering the fixed number of objects regions using spacing material. The disclosed architecture obviates conventional resolution-accommodating techniques of adding spacing material by providing a web page that matches the user video resolution and increases the number of banner advertising object regions to provide the visually-centered effect. Alternatively, the disclosed architecture provides that the size and dimensions of the banner objects may be changed. This feature is useful if the website server 102 provides a web page which has only a limited number of advertising banners to display.

The disclosed architecture is applicable in any scenario where a client/server system exists (e.g., intranet, extranet, wide area network, etc.). As illustrated, the user PC 100 may be connected through its respective network interface 106 to a local area network (LAN) 110 having a LAN server 112 disposed thereon. The LAN server 112 provides information back to the user PC 100 in the form of web pages. The object regions may contain any information the server administrator deems important to the user.

Figure 2:
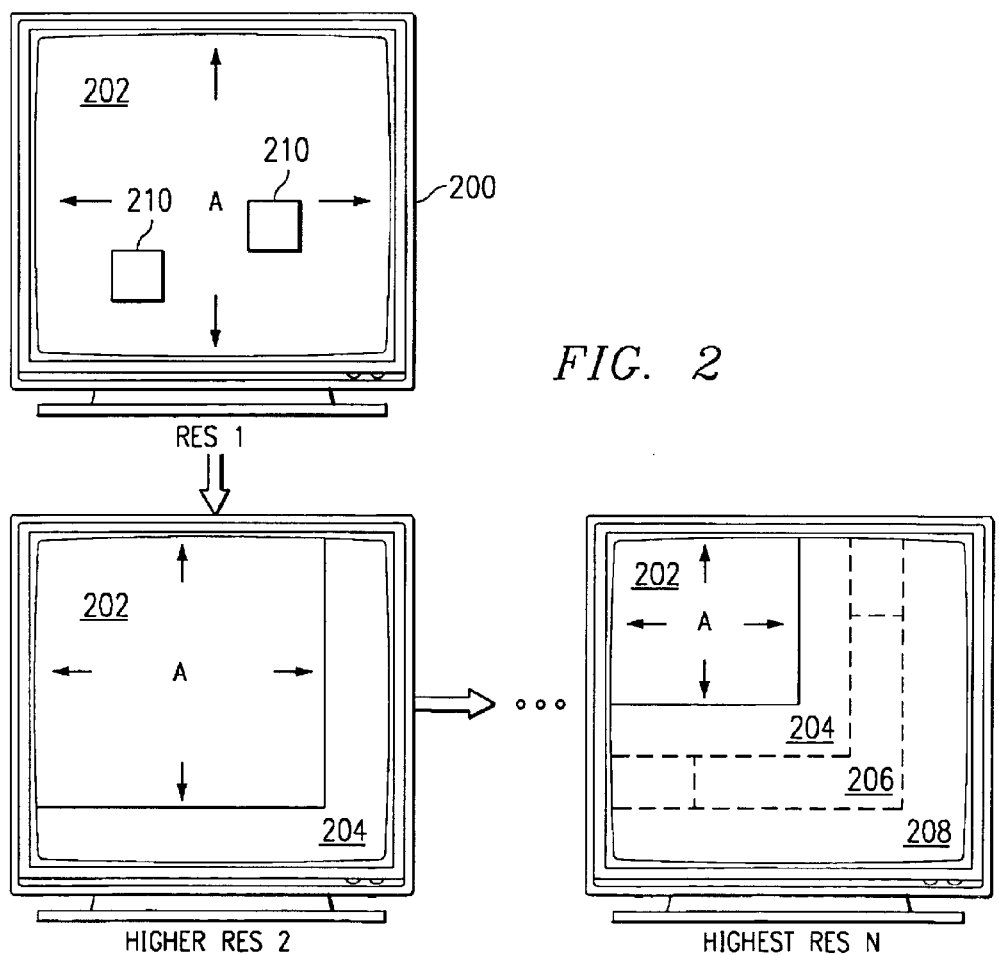
FIG. 2 illustrates a conventional object region spacing technique.

Referring not to FIG. 2, there is illustrated the content-controlling technique according to a disclosed embodiment. The disclosed technique presents additional banner advertising to the user as the video resolution of the user PC 100 increases. There is provided a display 200 having a viewable area 202, which display 200 may be any size. As mentioned herein above, the 17" display (a monitor) is rapidly becoming the display of choice sold with many computer systems, although the information in any display is automatically scaled as a function of the size of the viewable area of the display to fill the viewable area in the same proportional amount (for some resolution).

At a first video resolution RES1, the viewable content A is configured to extend to fill the viewable area 202, since it is defined at the source to occupy a fixed number of picture elements (hereinafter called "pixels"). When moving to a higher resolution RES2, the viewable content A is reduced in size (from the perspective of the user) leaving a residual area 204 free of content due to the fact that the display will now accommodate more pixels, with the content A occupying the same number of pixels, albeit with an overall reduced size. The viewable content therefore occupies the same number of pixels, but appears to be reduced, due to the increased video resolution, i.e., larger number of pixels. When determining that the user PC 100 has a video resolution of RES2, the website server 102 presents the user with a web page having the combined content of viewable content A occupying the same number of pixels plus the banner advertising content of the residual area 204. This technique is used at all video resolutions, such that at a highest resolution RESN, the website server 102 presents a web page to the user that combines the viewable content A with all content in the residual areas, residual area 204, one or more intermediate residual areas 206, and a final residual area 208.

Alternatively, and as was mentioned herein above, where the website server 102 has only a limited number of banner objects 210 to present to the user at user PC 100, sensing a user PC 100 having a higher resolution RES2 may not allow the presentation of more banner objects 210 to the user, when all of the banner objects 210 can be displayed at the lower resolution RES1. In this instance, the existing banner objects 210 can be automatically increased in size (occupying more pixels) to provide a corresponding increase in advertising revenue. Similarly, where the limited number of banner objects 210 available for display at the higher resolution results in an insufficient coverage of the web page real estate at the higher resolution, a combination of the resizing of selected banner objects 210 and display of the remaining banner objects which have not been resized is a solution to maximizing coverage of the available web page real estate.

Figure 3:
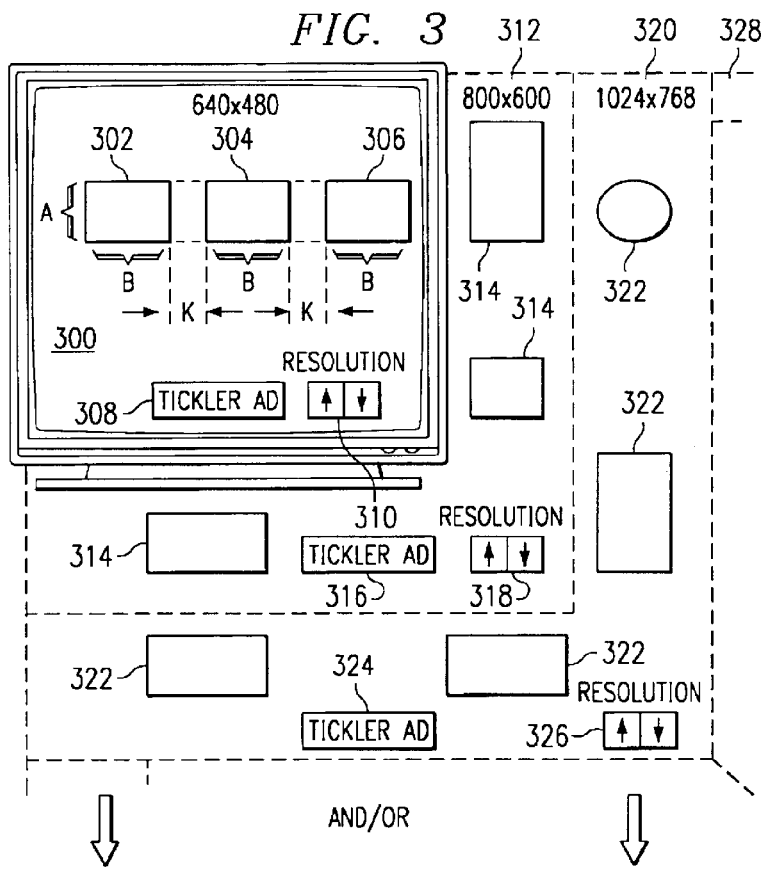
FIG. 3 illustrates a diagram of various video resolutions and the associated banner object regions displayed for each.
Figure 3:
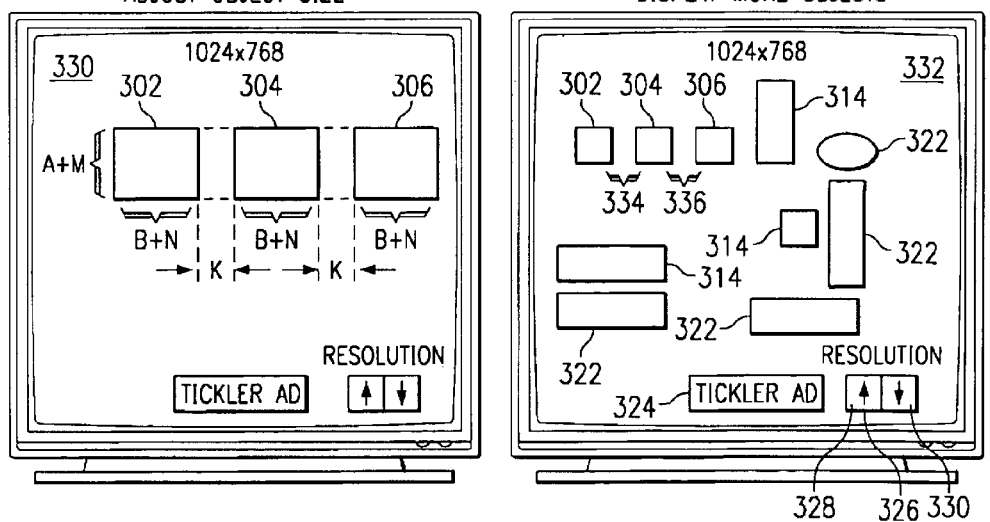

Referring now to FIG. 3, there is illustrated a diagram of various video resolutions and the associated banner objects displayed for each. A first viewport 300 having a resolution of 640×480 displays three banner objects (302, 304, and 306) of equal pixel dimensions A×B (the dimensions being equal for discussion purposes). The viewport 300 is that which a user would see on a user PC 100 having a video setting of 640×480 pixels. The viewport 300 also displays a tickler advertisement object 308 and a resolution selection object 310. As mentioned herein above, the tickler advertisement in the tickler advertisement object 308 is an inducement to the user to increase their video resolution. In this way, the web server 102 owner can obtain more revenue by increasing the number of banner advertisements being viewed by the user.

A viewport 312 is an 800×600 pixel resolution viewport and includes all of the objects displayed in the viewport 300 (except the ticker advertisement object 308 and the resolution selection object 310, as these are already provided in the pre-built viewport 312 web page) plus additional advertising objects 314. The additional advertising objects can be added for viewing by the user due to the increased resolution of the viewport 312. The objects will appear smaller to the user due to the increase in video resolution, wherein the objects did not increase in pixel size, but actually occupied a smaller display area at a higher resolution. The viewport 312 also contains a new tickler advertisement object 316 and a resolution selection object 318, both of which will be placed in the same areas of the viewport for all resolutions such that the user can easily locate the objects.

A viewport 320 is a 1024×768 resolution viewport and includes all of the objects displayed in viewports 300 and 312, plus additional advertising objects 322 (except the ticker advertisement objects 308 and 316, and the resolution selection objects 310 and 318, as tickler advertisement object 324 and a resolution selection object 326 are already provided in the pre-built viewport 320 web page.) Note that a viewport 328 has an even greater pixel resolution than viewport 320. The number of video resolutions is limited only by the capabilities of the user PC 100. Therefore, web pages can be designed for all resolutions, or simply for the most popular resolutions, at the discretion of the website owner.

If a user having a 640×480 resolution setting (as indicated by viewport 300) chooses to select a higher resolution setting of, for example, 1024×768, the disclosed architecture can either increase the size of the existing objects (as indicated by viewport 330), add more banner objects (as indicated by viewport 332), or both (not shown). The objects in viewport 330 have been increased in pixel size from an original dimension of A×B pixels in viewport 300 (a video resolution of 640×480) to a dimension of (A+M)(B+N) pixels, where M and N may or may not be equal. The spacing dimension K of the objects (302, 304, and 306) remains the same. This is to be compared to conventional techniques where spacing material is added with an increase in resolution, and removed with a decrease in resolution. In this way, visual centering can be maintained with a dimensional increase of the objects (in their pixel size), and also which has a corresponding increase in advertising revenue.

A viewport 332 is a complete viewport at a resolution of 1024×768 showing all object regions of the lower-resolution layouts (viewports 300 and 312 minus the associated tickler advertisements and resolution selection objects). The viewport 332 contains the objects 302,304, 306, 314, and 322 which the user views at the user PC 100. The tickler advertisement object 324 and resolution selection object 326 are also placed in the general location of the web page as in the other viewports 300 and 312, and may be increased in size for easier viewing, at the discretion of the web page designer. As mentioned herein above, the interstitial spaces 334 and 336 remain the same as dimension K in viewport 300, according to the disclosed architecture. However, optionally, the dimensions of objects 302, 304, and 306 may be increased to account for the reduction in object size when moving to a higher resolution setting. Note that object scaling and geometry alterations are performed with a geometry management algorithm which calculates the new dimensions for the object without increasing the horizontal spacing between the objects.

In more sophisticated implementations, the disclosed architecture provides that the web pages can be assembled on-the-fly according to the user PC 100 video settings by sorting algorithms which select the banner advertisement objects according to criteria, for example, size, revenue-generating potential, animation involved, etc. The size (in pixels) and shape of a particular banner advertisement object is a factor as to where it will be placed on the web page for a given resolution before sending the completed web page to the user PC 100 for viewing. A determination as to whether an animated banner is used can be based upon the connection bandwidth of the user PC 100. Animated banners require greater download times, thus higher bandwidth connections can more easily accommodate the larger file sizes associated with a web page having animated banners.

The disclosed architecture also provides that a content object is operable to have associated therewith a drop-down feature such that where object expansion in an upward or downward direction is provided, the content object is increased in pixel size in the essentially downward direction to increase the web page real estate captured by advertising. Therefore, advertising revenue can be increased accordingly by invoicing the advertisers according to the respective increase in real estate covered by the advertisement of the particular content object as presented to the particular user.

Referring now to FIG. 4, there is illustrated a flowchart of the process for a vendor server detecting and developing a web page according to the user video settings. Flow begins at a Start block and proceeds to a function block 400 where the user launches a browser program (i.e., a communication program) in preparation for accessing one or more website servers 102 disposed on the GCN 104. The user accesses the web server 102 using the browser application, as indicated in function block 420. The web server 102 then queries the user PC 100 for its current video settings, as indicated in function block 404. The query may directly access the user PC 100 operating system to obtain this video information. The browser then transmits the video settings information to the website server 102, as indicated in function block 406. In a function block 408, the website server 102 then processes the video settings information to determine what type of web page should be transmitted to the user PC 100 for display. As mentioned herein above, this process involves either resizing the existing object regions, adding more banner advertising regions, or both. Flow is then to a function block 410 where the website server 102 transmits the web page back to the user PC 100 for display. The process then ends at a Stop block. Note that, where a web server 102 is such that it cannot operate according to the disclosed architecture, the video settings automatically provided by the browser application are simply discarded. Also note that other methods for obtaining the user PC 100 video settings may be used. For example, the browser application may directly access the operating system for the video settings upon launch, and pass the video settings to web server 102 when the initial access is made. However, this scenario requires unnecessary network traffic, particularly if the web server 102 is not operable according to the disclosed architecture.

Referring now to FIG. 5, there is illustrated a flowchart of the process for implementing the tickler advertisement and resolution selection regions. As mentioned herein above, the tickler advertisement object is an inducement to encourage the user to increase his or her video resolution in order to obtain a reward or offer. Increasing the video resolution also increases the number of banner advertisement objects which the user will view. Flow begins at a Start block and proceeds to a function block 500 where the user launches the browser program. The user accesses the web server 102 using the browser application, as indicated in function block 502. The web server 102 then queries the user PC 100 for the video settings, as indicated in function block 504. The browser then transmits the user video information to the web server 102, as indicated in ftunction block 506. In a function block 508, the web server 102 processes the video setting information and develops a web page according to the received video settings of the user PC 100. Note that the web pages need not be developed after the setting information is obtained, but can be predefined such that it becomes a matter of simply selecting the particular web page having the appropriate resolution which matches the user PC 100 video settings. Flow is to a function block S10 where the web server 102 transmits the web page to the-user PC 100 for display.

After the user views the web page, flow is to a decision block 512 which monitors whether the user wants to increase the user PC 100 video resolution in response to the tickler advertisement. If not, flow is out the "N" path and loops back to the input of the decision block. If the user chooses to change the resolution, flow is out the "Y" path to a function block 514 where the user selects either of the resolution changing icons (328 or 330) which make up the resolution selection object 326. As illustrated in FIG. 3, an up-arrow 328 causes a corresponding increase in video resolution while a down-arrow causes a corresponding reduction in video resolution. Flow is then to a function block 516 where the browser detects the user request to change the resolution setting. The browser then sends the resolution request to the OS to change the video settings of the user PC 100. Flow is then to a function block 518 where the browser then notifies the web server 102 of the change in user video settings. The web server 102 then selects a new web page meeting the new user video settings and transmits the web page back to the user PC 100 for display, as indicated in a function block 520. Flow then loops back to the input of decision block 512 to monitor whether the user chooses to make further video resolution changes.

Note that all viewport illustrations comprise typical web page features such as activity fields or indicators, window resizing icons, uniform resource locator (URL) address field, scroll bars, etc., commonly found on many web pages. The disclosed architecture takes into consideration these features when resizing objects and/or adding more banner objects of a web page.

It can be appreciated that with the convergence of broadcast media with the GCN 104, the introduction of high definition television (HDTV) and large screen televisions used for the display of packet-switched content can take advantage of the disclosed architecture.

In summary, an architecture is disclosed where a web server obtains video resolution information of a user PC 100 when the user accesses the web server 102. In response, the web server 102 returns a web page to the user PC 100 which is customized according to the video resolution of the user PC 100. The disclosed architecture provides more banner advertising objects to a user PC 100 that has a higher video resolution. Alternatively, where the number of banner advertising objects are limited, the web server returns a web page to the user PC 100 having banner objects which have increased dimensions corresponding to a higher video resolution. The geometry management algorithm also provides for the instance of the customized web page having both banner objects of increased dimension and more objects for a higher video resolution. A group or pool of banner objects can be maintained such that the geometry algorithm automatically configures the layout of the web page for maximum coverage of available web page space according to a given video resolution. Advertisers are then charged according to the dimensions of the banner object and duration of time the advertisement was presented to the user.

Although the preferred embodiment has been described in detail, it should be understood that various changes, substitutions and alterations can be made therein without departing from the spirit and scope of the invention as defined by the appended claims.

What is claimed is:

1. A method of presenting banner advertising of a web page to a user, comprising the steps of:

providing a server node that is disposed on a network that interfaces with a user node disposed on the network to allow communication between the server node and the user node such that web page content can be provided from a particular uniform resource locator (URL) that includes content that is uniquely associated with the URL and banner advertising that is variable and defined by the server of the content;

obtaining from the user node current video resolution settings of the user node by the server node over the network and without user intervention in response to the user accessing the server node and at the time of the user gaining access to the server node, which obtained video resolution settings represent the user node resolution settings at the time of access to the server node by the user; and after determining the video resolution settings of the user node by the server node in direct response to receiving a request for access of information therefrom, transmitting to the user node from the server node a web page having maximized viewable banner advertising content which correspond to the determined video resolution settings of the user node at the time of transmission, wherein the size of the banner advertising can be varied as a function of the video resolution settings of the user node without varying the size of the content, such that the relative size of the content to the banner can be varied depending upon the resolution settings of the user node.

2. The method of claim 1, wherein the step of obtaining obtains the video resolution settings from an operating system of a user computer of the user node.

3. The method of claim 1, wherein during the step of obtaining, the server node queries the user node for the video resolution settings via a resolution request signal.

4. The method of claim 1, wherein during the step of transmitting, the server node transmitting the web page having one or more banner objects which have been increased in size in relationship to a given video resolution and one or more of said banner objects which have not been increased in size to that given video resolution.

5. The method of claim 1, wherein during the step of transmitting, the server node transmits the web page having one or more banner objects which have been increased in size in relationship to a given video resolution and without adding spacing material.

6. The method of claim 1, wherein the server node has one or more predefined web pages for corroding to one or more predetermined video resolutions, and select ones of the one or more of the predefined web pages are transmitted to the user node during the step of transmitting according to the video resolution of the user node.

7. The method of claim 1, wherein a geometry management algorithm automatically structures layout of the web page using one or more banner objects which are scaled in size and altered in geometry such that web page real estate coverage is maximized without adding spacing material.

8. The method of claim 1, wherein the user node includes a display, the step of transmitting further comprising maximizing the viewable banner advertising content without changing pixel dimensions of other viewable objects on the display.

9. The method of claim 8, wherein the viewable banner advertising content is maximized without changing pixel spacings between other viewable objects on the display.

10. An architecture for presenting banner advertising of a web page to a user, comprising:

a server node that is disposed on a network that interfaces with a user node disposed on said network to allow communication between the server node and the use node, said server node having such that web page content can be provided from a particular uniform resource locator (URL) that includes content that is uniquely associated with the URL and banner advertising that is variable and defined by the server of the content;

means for obtaining from the user node current video resolution settings of said user node over said network and without user intervention in response to the user accessing said server node over said network at the time of the user gaining access to the server node, which obtained video resolution settings represent the user node resolution settings at the time of access to the server node by the user; and means for transmitting a web page having maximized viewable banner advertising content to said user node from said server node, after determining the video resolution settings of the user node by the server node in direct response to the server node receiving a request for access of information therefrom, which web page corresponds to the video resolution settings of said user node, the video resolution of the web page set in response to said means for obtaining said video resolution settings of said user node, wherein the size of the banner advertising can be varied as a function of the video resolution settings of the user node without varying the size of the content, such that the relative size of the content to the banner can be varied depending upon the resolution settings of the user node.

11. The architecture of claim 10, wherein said means for obtaining obtains said video resolution settings from an operating system of a user computer of said user node.

12. The architecture of claim 10, wherein said server node queries said user node for said video resolution settings via a resolution request signal.

13. The architecture of claim 10, wherein said server node transmits the web page having one or more banner objects which have been increased in size in relationship to a given video resolution, and select ones of said one or more barmer objects which have not been increased in size to said given video solution.

14. The architecture of claim 10, wherein said server node transmits the web page to said user node, the web page braving one or more banner objects which have been increased in size in relationship to a given video resolution without adding spacing material.

15. The architecture of claim 10, wherein said server node has one or more predefined web pages for corresponding to one or more predetermined video resolutions, and select ones of said one or more of the predefined web pages are transmitted to said user node according to said video resolution of said user node.

16. The architecture of claim 10, wherein a geometry management algorithm automatically structures layout of the web page using one or more banner objects which are scaled in size and altered in geometry such that web page real estate coverage is maximized without adding spacing material.

17. The architecture of claim 10, wherein said user node includes a display and said viewable banner advertising content is maximized without changing pixel dimensions of other viewable object, on said display.

18. The architecture of claim 17, wherein said viewable banner advertising content is miximized without changing pixel spacings between other viewable objects on said display.

* * * * *